United States Patent
Sullivan

(10) Patent No.: US 7,099,840 B1
(45) Date of Patent: Aug. 29, 2006

(54) SYSTEM AND METHOD FOR PURCHASING OVER THE INTERNET

(75) Inventor: John T. Sullivan, Princeville, HI (US)

(73) Assignee: William Herman, Cincinnati, OH (US)

( * ) Notice: Subject to any disclaimer, the term of this patent is extended or adjusted under 35 U.S.C. 154(b) by 663 days.

(21) Appl. No.: 09/565,374

(22) Filed: May 5, 2000

(51) Int. Cl.
*G06F 17/60* (2006.01)

(52) U.S. Cl. .......................................... 705/37; 705/36

(58) Field of Classification Search ............... 705/1, 705/25–40
See application file for complete search history.

(56) References Cited

U.S. PATENT DOCUMENTS

| | | | |
|---|---|---|---|
| 5,794,207 A * | 8/1998 | Walker et al. ................ | 705/1 |
| 6,014,635 A | 1/2000 | Harris et al. | |
| 6,041,308 A * | 3/2000 | Walker et al. ................ | 705/14 |
| 6,078,897 A | 6/2000 | Rubin et al. | |
| 6,085,169 A * | 7/2000 | Walker et al. ................ | 705/26 |
| 6,105,000 A | 8/2000 | Hickman et al. | |
| 6,418,415 B1 * | 7/2002 | Walker et al. ................ | 705/26 |
| 6,466,919 B1 * | 10/2002 | Walker et al. ................ | 705/37 |
| 6,493,722 B1 * | 12/2002 | Daleen et al. ............ | 707/104.1 |
| 6,553,346 B1 * | 4/2003 | Walker et al. ................ | 705/1 |

* cited by examiner

*Primary Examiner*—Frantzy Poinvil
(74) *Attorney, Agent, or Firm*—Neield IP Law, PC

(57) ABSTRACT

A computer implemented invention provides a system and method for receiving at a server computer system first signals containing a conditional acceptance of an offer in association with an identification of a first entity conditionally accepting said offer, said offer containing a price; checking signals received by said server computer system during a period from said date of conditional acceptance of said offer to determine if said signals contain an identification of said offer in association with an identification of a second entity and a contribution by said second entity to said price; and debiting accounts for the entity or the entities contributing to said price, thereby enabling a group on entities to contribute to satisfying the conditions of an offer.

23 Claims, 2 Drawing Sheets

SYSTEM AND METHOD FOR PURCHASING OVER THE INTERNET

BACKGROUND OF THE INVENTION

1. Field of the Invention

This invention relates to the field of Internet marketing.

2. Discussion of the Background

With the increasing popularity of the Internet and the World Wide Web, it has become common for merchants to set up Web sites (server computer systems serving web pages to client computers) for marketing and selling goods. Via these web sites, users (i.e., people using client computers) can access and place orders for millions of products.

One problem commonly encountered by online merchants is an inability to effectively market goods via their Web sites. Web sites are designed to handle two party goods and service transactions where a user using a client computer purchases a good or a service from a merchant by sending instructions from the user's client computer to the merchant's server computer. These transactions typically involve additional parties enabling the crediting of the transaction. The additional parties are a credit card company providing the user a line of credit and a merchant account company authorizing or denying and accounting for the merchant's charges to user's credit cards.

Another problem commonly faced by online merchants is an inability to efficiently attract potential consumers to their Web sites. One way of attracting consumers has been to market the site through television, newspaper and Internet advertisements. However, advertising a site using conventional methods can be expensive, and can consume significant human resources. In addition, it is often difficult or impossible to evaluate the effectiveness of a given advertisement.

The present invention addresses these and other problems.

SUMMARY OF THE INVENTION

Objects of the Invention

Accordingly, it is a first object of the invention is to provide means for merchants to effectively market goods and services via their Web sites to users.

A second object of the invention is to provide means for merchants to build a database of users including user contact information, and user buying preferences for use in marketing to those users.

The present invention accomplishes these and other objects by providing a computer server system programmed with software to provide a method of use enabling an Internet sales entity, referred to herein as the "merchant," to efficiently market and sell goods and services in cooperation with users interested in buying goods and services by enabling these users to attract partner purchasers to cooperate in the purchase of a product or service. In effect, the invention enables the users to act in a cooperative manner to purchase a good or service, and enables and provides a strong motivation for the users to attract potential customers to the merchant's web site. The invention accomplishes these effects by enabling a user who is interesting in purchasing a good or service to solicit additional users to join in sharing the cost of the purchase of the good or service. Alternatively, the system provides means for determining and soliciting additional prospective joint purchases to share in the costs of purchase of a good or service in which user expresses an interest in participating in a joint purchase.

The system of the invention provides a computer implementing a means for receiving at a server computer system first signals containing a conditional acceptance of an offer in association with an identification of a first entity conditionally accepting said offer, said offer containing a price; checking signals received by said server computer system during a period from said date of conditional acceptance of said offer to determine if said signals contain an identification of said offer in association with an identification of a second entity and a contribution by said second entity to said price; and debiting accounts for the entity or the entities contributing to said price.

The system of the invention further provides means for determining that signals received by said server computer system during a period from said date of conditional acceptance of said offer by said first entity contain an identification of said offer in association with an identification of a second entity and a contribution by said second entity to a price of the offer.

The system further provides means wherein a condition of said conditional acceptance by said first entity is a contribution to said price by said second entity, and/or wherein a condition of said conditional acceptance by said first entity is an elapsing of a period from the date of conditional acceptance, and/or wherein a condition of said conditional acceptance by the first entity is accepting by said server computer system contributions to the price for the offer during said period by an entity other than said first entity, and/or wherein a condition of said conditional acceptance is a contribution to said price by an entity other than said first entity and/or wherein a condition of said conditional acceptance by said first entity is contribution by entities other than said first entity equaling or exceeding the price of the offer, and/or wherein the offer comprises an offer for sale of at least one of a good and a service.

The system further provides means for transmitting from a server computer system signals containing information providing said offer, crediting an account for said at least one of a good and a service, and/or transmitting additional signals to a second addresses associated with a first address associated with said first signals, said additional signals identifying said offer, and soliciting a contribution by said second entity to said price.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
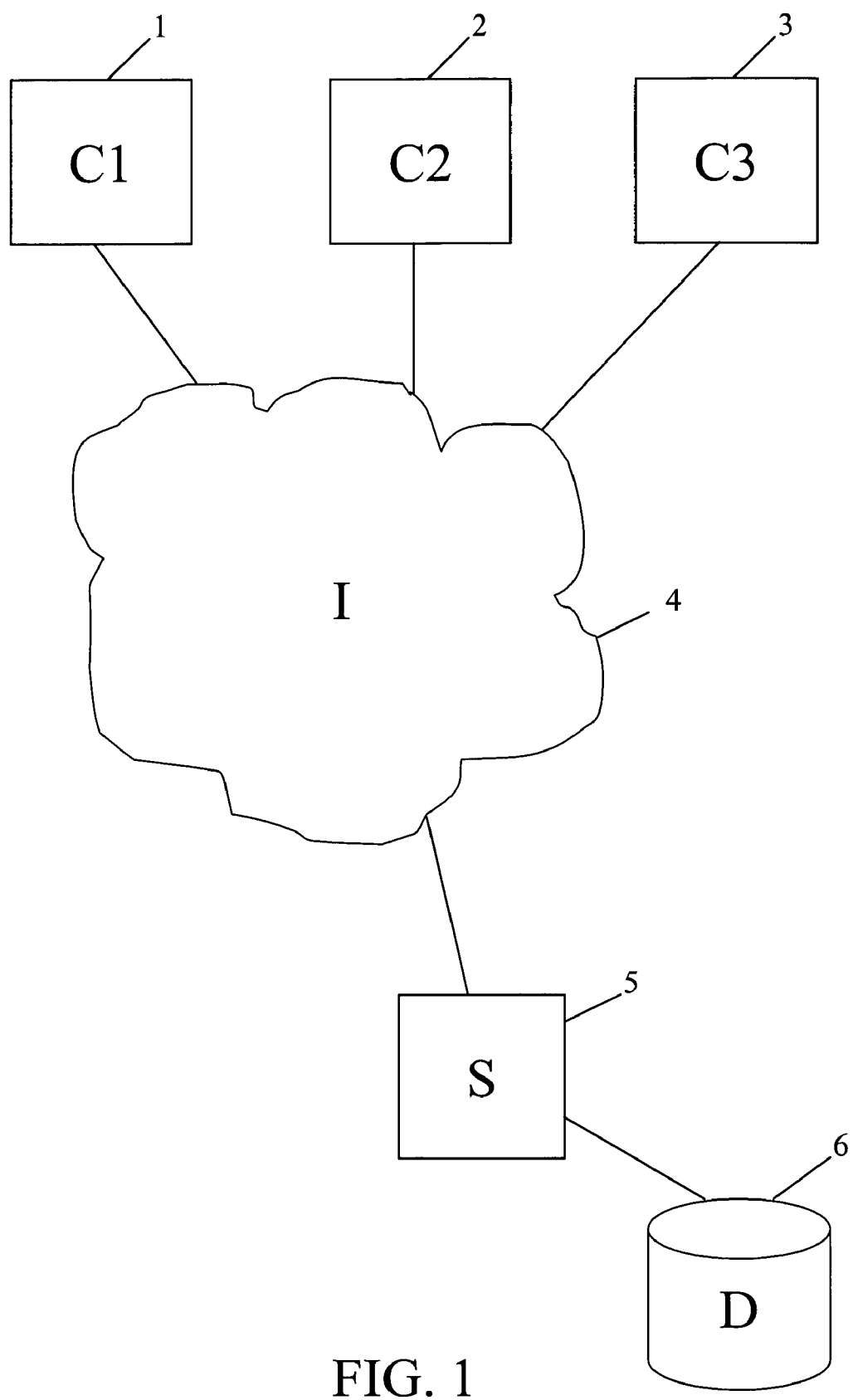
FIG. 1 is a schematic showing a network of digital computers including computers hosting a novel bench marking computer system of the invention.

In the drawings, like reference numerals designate identical or corresponding parts throughout the several views.

FIG. 1 shows digital client computers 1, 2, 3, such as a personal computer, each containing an electrical power supply; a central processing unit; means for storing and retrieving data from data storage media; data storage media such as random access memory, read only memory, magnetic disk media, optical disk media; user input/output devices, such as a mouse, a keyboard, and a monitor. The client computers 1, 2, 3 are each capable of running an operating system, such as a version of Windows or Unix coordinating the activity of the various components of the personal computer. The operating system preferably enables the computer to execute web browser software, such as a version of Netscape Navigator or Internet Explorer so that the client computers 1, 2, 3 each function as an Internet network client. However, the personal computers 1, 2, 3 may alternatively be capable of operating dumb or smart terminal software or any form of continuous session inter computer connection software.

FIG. 1 also shows a network 4 such as the Internet through which the client computers 1, 2, 3 interact, for example using TCP/IP protocol, with a server computer system 5 and, indirectly via the control of the server computer system 5, with a database 6. It is to be understood that client computers 1, 2, 3, are representative of a large number of computers that may communicate with server computer system 5. It is also understood that database 6 is representative of at least one database file which can be accessed and updated using server computer system 5. For example, database 6 may include a table of records for users in which each record contains a user identification (e.g., user's real name or a user name), and in association therewith a user password, user prior purchase history, user contact information including email and postal address, and user demographics (e.g., age, gender, etc.). The database may also contain at least one table with data for products for sale, each record of a product table may include a product name, product identification, stock number, stock availability, price, etc. the database may also contain tables for processing orders, such as open orders with data identifying status, each table including for example, product identification, purchasers' identifications', shipping instructions, status information on the shipment.

In addition, and as pertinent to this invention, the open orders table may include in each table listing of data relevant to wether conditions precedent to the order being executed, such as an indication whether total of costs assumed by a group of purchasers equal or exceeds the cost of the good or service to be purchased, the identifications of each member of the group of purchasers of the good or service, and the fractional contributions to the cost of the good or service offered which is to be paid by each one of the group of purchasers, and also a time limit period during which the conditions precedent (such as costs assumed equaling or exceeding the offer price) can be satisfied.

Of course, it may be that one entity has assumed the liability for paying the price thereby forming an executable contract, but that entity will allow contributions to the price by one or more third party entities during some period of time. This type of time period condition is believed to be especially useful for the purchase of large cost gifts for third party beneficiaries, such as for purchase of presents for weddings or newly engaged couples.

Figure 2:
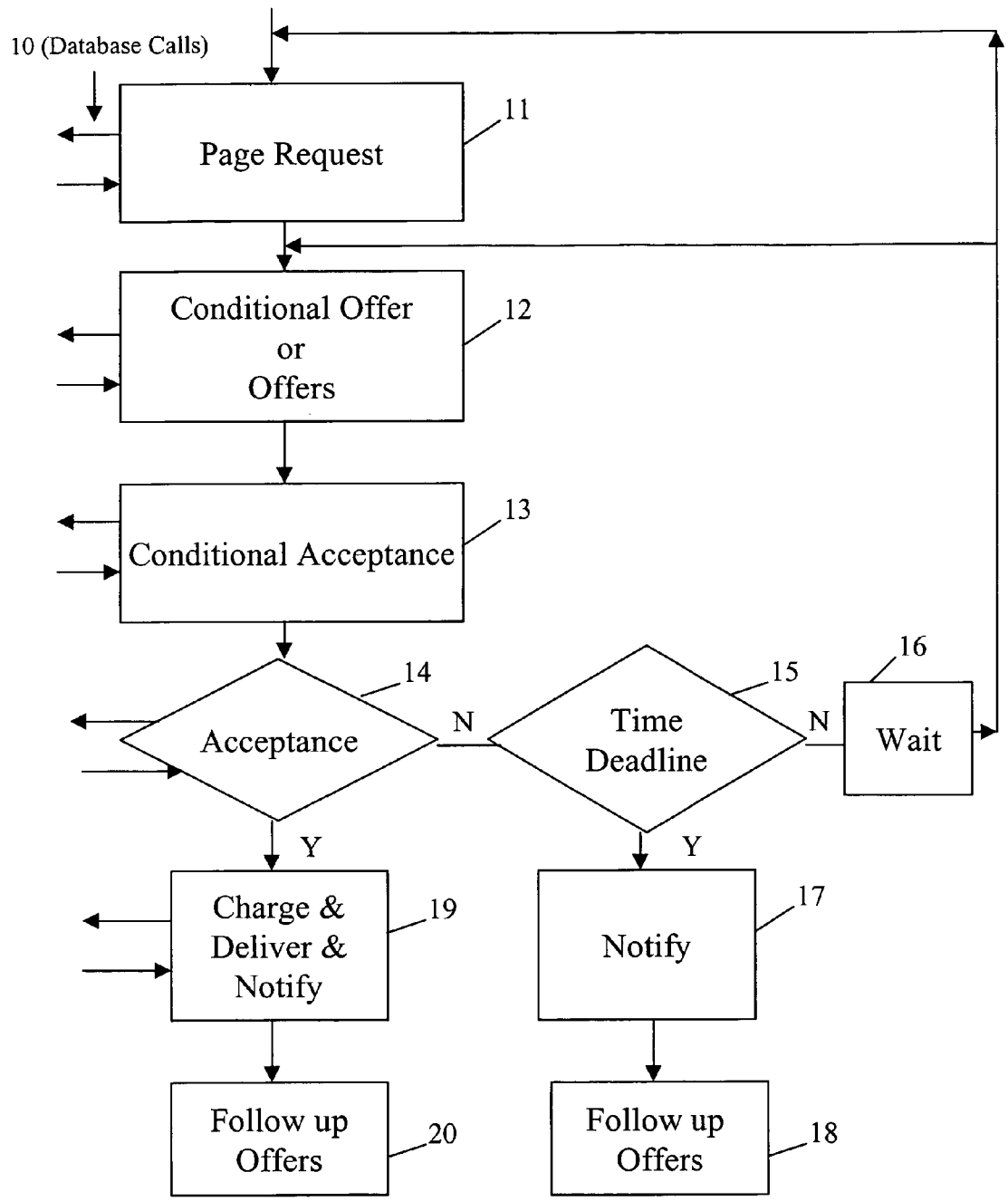
FIG. 2 is a high level flow chart of a novel bench marking processes of the invention.

FIG. 2 shows process flow relating to software running on the server computer system 5 and communications to the server computer system 5 received from client computers 1, 2, 3. The horizontally directed arrows 10 on the left side of FIG. 2 illustrate that many of the operations of the server involve queries and updates of the database 6.

In step 11, the server computer system 5 receives a page request from a client computer (not shown), and in response it serves a web page to the address for the client computer. The web page served to the client computer is typically part of a virtual session, in which session management variables are passed to the client computer via addresses contained in the links in the web page served to the client computer. The web page served to the client computer in step 11 may be an introductory web page which establishes the virtual session with the user of the client computer.

In step 12, in response to signals received from a client computer, the server computer system 5 serves to the client computer a web page containing at least one of a conditional offer and a non-conditional offer. The conditional offer is an offer for a user to accept a contract that contains additional conditions that must be fulfilled at some point in the future. For example, those conditions could be a contribution to the price of one or more third party entities. In addition, those conditions could be (1) a donation by one or more third party entities to the price of a product not forming part of the conditional offer or (2) a donation to a charitable cause. Both the conditional offers and the non-conditional offers may contain provisions for delaying execution of the offer thereby allowing third party entities a period of time in which to contribute to the price of the goods or services identified in the offer.

Alternatively, in step 12, the server computer system 5 may serve up to a user a page containing terms already accepted by a first user of a predetermined conditional or an non-conditional offer and allow the current user a chance to satisfy a condition of the prior offer, such as a contribution to the price of the prior offer, a contribution to a price of an unrelated offer, or a contribution to a charitable cause. That is, step 12 incorporates (1) the step of offering new offers to a user in which the offer is initially set up and identified with the first user, and in which the terms of the offer are identified and may be recorded in the database 6, and also (2) the step of providing that offer to subsequent users of the web site provided by the web server computer system 5.

Accepted conditional or non-conditional offers (such as those identified in step 12) are stored in the database 6. The offers are stored in connection with an offer identification. The offer identification may be the name or user name or identification of the first entity accepting the conditional or non-conditional, or may be an offer identification stored in association with an identification of the first user accepting the offer. In any case, subsequent users of the server computer system 5 may identify an offer to which they wish to contribute by providing a signal to the web server computer system 5 containing the identification of the offer. The subsequent users may obtain the identification of the offer either (1) from the first user accepting the offer or (2) from data obtained from the web server computer system 5. The subsequent users may obtain the identification of the offer from the web server computer system 5, for example, by reviewing a registry of outstanding offers provided in web pages by the server computer system 5 (not shown). Alternatively, the subsequent users may obtain information about the offer from the first user that initiated the offer.

In step 13, the server computer system 5 receives a signal from a client computer indicating an acceptance of an offer provided in step 12. The acceptance may be either conditional or non-conditional. However, preferably the acceptance requires, as provided for in the terms of the offer provided to the user of the client computer in step 12, a period of time during which third parties may contribute in the manners identified above.

In step 14, the sever computer system 5 determines whether any conditions of an offer have been accepted.

In step 19, if the offer has been accepted, the server computer system 5 performs steps necessary to account of the acceptance of the offer. These steps typically includes charging the users credit account, transmitting signals and requesting delivery of accepted goods or services, and notifying, for example via email, the parties contribution to the acceptance.

In step 20, preferably, the server computer system 5 provides additional follow up offers to the users involved in the transaction of the acceptance identified in step 14.

In step 15, if the server computer system indicates that the offer has not been accepted, the server computer system determines whether a time deadline for the offer has expired.

In step 16, if the server computer system 5 has determined in step 15 that the time deadline for the offer has not expired, it enters a wait state with respect to that offer awaiting a request for additional web pages related to that offering, such as the web page request associated with steps 11 and 12.

In step 17, if the server computer 5 determines that the offer has not been accepted in step 14 and that the time deadline for the offer has expired in step 15, the server computer system 5 notifies the users associated with the conditional offer of that information.

In step 18, preferably, the server computer system 5 provides to the users associated with an offer that has not been accepted additional follow up offers. For example, the user computer system could provide to each of the users an offer to non-conditionally and immediately purchase for the full purchase price the good or service identified in the prior conditional offer.

In summary, the present invention provides a mechanism to enable a plurality of entities to contribute to the purchase of a good or service by providing to those entities offers in which each entity may contribute a portion of the price and providing a time duration during which contributions will be accepted. This enable entities to pool their resources to purchase goods or services that they might not otherwise purchase. While the invention may especially suited for providing large ticket gifts to third parties, it also obviously may be used by commercial entities to identify other entities in need of the same large ticket items and to pool the resources in order to purchase and preferably collectively use a large ticket price item.

Obviously, numerous modifications and variations of the present invention are possible in light of the above teachings. It is therefore to be understood that within the scope of the appended claims, the invention may be practiced otherwise than as specifically described herein.

The invention claimed is:

1. A computer implemented method comprising the steps of:
   receiving at a server computer system first signals containing a conditional acceptance of an offer in association with an identification of a first entity conditionally accepting said offer, said offer containing a price;
   checking signals received by said server computer system during a period from said date of conditional acceptance of said offer to determine if said signals contain an identification of said offer in association with an identification of a second entity and a contribution by said second entity to said price; and
   debiting accounts for the entity or the entities contributing to said price.

2. The method of claim 1 further comprising the step of determining that signals received by said server computer system during a period from said date of conditional acceptance of said offer by said first entity contain an identification of said offer in association with an identification of a second entity and a contribution by said second entity to said price.

3. The method of claim 1 wherein a condition of said conditional acceptance by said first entity is a contribution to said price by said second entity.

4. The method of claim 1 wherein a condition of said conditional acceptance by said first entity is an elapsing of said period from said date of conditional acceptance.

5. The method of claim 1 wherein a condition of said conditional acceptance by said first entity is accepting by said server computer system contributions to said price for said offer during said period by an entity other than said first entity.

6. The method of claim 1 wherein a condition of said conditional acceptance is a contribution to said price by an entity other than said first entity.

7. The method of claim 1 wherein a condition of said conditional acceptance by said first entity is contribution by entities other than said first entity equaling or exceeding said price.

8. The method of claim 1 further comprising the step of transmitting from a server computer system signals containing information providing said offer.

9. The method of claim 1 wherein said offer comprises an offer for sale at least one of a good and a service.

10. The method of claim 1 further comprising the step of crediting an account for said at least one of a good and a service.

11. The method of claim 1 further comprising the step of transmitting additional signals to a second address associated with a first address associated with said first signals, said additional signals identifying said offer, and soliciting a contribution by said second entity to said price.

12. A computer server system comprising:
   means for receiving at a server computer system first signals containing a conditional acceptance of an offer in association with an identification of a first entity conditionally accepting said offer, said offer containing a price;
   means for checking signals received by said server computer system during a period from said date of conditional acceptance of said offer to determine if said signals contain an identification of said offer in association with an identification of a second entity and a contribution by said second entity to said price; and
   means for debiting accounts for the entity or the entities contributing to said price.

13. The system of claim 12 further comprising:
   means for determining that signals received by said server computer system during a period from said date of conditional acceptance of said offer by said first entity contain an identification of said offer in association with an identification of a second entity and a contribution by said second entity to said price.

14. The system of claim 12 wherein a condition of said conditional acceptance by said first entity is a contribution to said price by said second entity.

15. The system of claim 12 wherein a condition of said conditional acceptance by said first entity is an elapsing of said period from said date of conditional acceptance.

16. The system of claim 12 wherein a condition of said conditional acceptance by said first entity is accepting by said server computer system contributions to said price for said offer during said period by an entity other than said first entity.

17. The system of claim 12 wherein a condition of said conditional acceptance is a contribution to said price by an entity other than said first entity.

18. The system of claim 12 wherein a condition of said conditional acceptance by said first entity is contribution by entities other than said first entity equaling or exceeding said price.

19. The system of claim 12 further comprising means for transmitting from said server computer system signals containing information providing said offer.

20. The system of claim 12 wherein said offer comprises an offer for sale at least one of a good and a service.

21. The system of claim 12 further comprising means for crediting an account for said at least one of a good and a service.

22. The system of claim 12 further comprising means for transmitting additional signals to a second addresses associated with a first address associated with said first signals, said additional signals identifying said offer, and soliciting a contribution by said second entity to said price.

23. A computer program product storing instructions for programming a computer to perform the steps of:
  receiving at a server computer system first signals containing a conditional acceptance of an offer in association with an identification of a first entity conditionally accepting said offer, said offer containing a price;
  checking signals received by said server computer system during a period from said date of conditional acceptance of said offer to determine if said signals contain an identification of said offer in association with an identification of a second entity and a contribution by said second entity to said price; and
  debiting accounts for the entity or the entities contributing to said price.

\* \* \* \* \*